(12) United States Patent
Usami

(10) Patent No.: US 10,162,185 B2
(45) Date of Patent: Dec. 25, 2018

(54) HEAD-MOUNTED DISPLAY AND BRIGHTNESS CONTROL METHOD

(71) Applicant: Sony Interactive Entertainment Inc., Tokyo (JP)

(72) Inventor: Morio Usami, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/521,032

(22) PCT Filed: Aug. 26, 2015

(86) PCT No.: PCT/JP2015/074015
§ 371 (c)(1),
(2) Date: Apr. 21, 2017

(87) PCT Pub. No.: WO2016/072131
PCT Pub. Date: May 12, 2016

(65) Prior Publication Data
US 2017/0329144 A1    Nov. 16, 2017

(30) Foreign Application Priority Data

Nov. 4, 2014   (JP) ................................ 2014-224155

(51) Int. Cl.
*G02B 27/02*        (2006.01)
*G09G 5/00*         (2006.01)
(Continued)

(52) U.S. Cl.
CPC .......... *G02B 27/026* (2013.01); *G02B 27/02* (2013.01); *G09G 3/001* (2013.01); *G09G 5/00* (2013.01);
(Continued)

(58) Field of Classification Search
None
See application file for complete search history.

(56) References Cited

U.S. PATENT DOCUMENTS 4,847,603 A * 7/1989 Blanchard .............. G02B 27/01
340/980
5,617,112 A    4/1997 Yoshida
(Continued)

FOREIGN PATENT DOCUMENTS

EP      2043079 A2    4/2009
JP      1987043980 A  2/1987
(Continued)

OTHER PUBLICATIONS

International Preliminary Report on Patentability and Written Opinion for corresponding PCT application No. PCT/JP2015/074015, 13 pages, dated May 18, 2017.
(Continued)

*Primary Examiner* — Jennifer D. Carruth
(74) *Attorney, Agent, or Firm* — Matthew B. Dernier, Esq.

(57) ABSTRACT

In a head-mounted display for presenting a video by shielding an outside world from a field of view of a user when mounted on the user, an information presentation block presents information including audio and a moving image to the field of view of the user; a video reproduction block reproduces a video of content; a camera takes a video of the outside world; a switching block selectively switches between the video of the content and the video of the outside world and causes the selected video to be presented onto the information presentation block; and a gain control block, when the switching block switches from the video of the content to the video of the outside world, gradually increases a brightness of the video of the outside world.

6 Claims, 4 Drawing Sheets

(51) Int. Cl.
  *G09G 5/10* (2006.01)
  *G09G 3/00* (2006.01)
  *H04N 5/225* (2006.01)
  *H04N 5/235* (2006.01)

(52) U.S. Cl.
  CPC ............. *G09G 5/10* (2013.01); *H04N 5/2253* (2013.01); *H04N 5/2351* (2013.01); *G09G 2320/0653* (2013.01)

(56) References Cited

U.S. PATENT DOCUMENTS

| | | | |
|---|---|---|---|
| 7,825,980 | B2 | 11/2010 | Takizawa |
| 8,797,347 | B2 | 8/2014 | Miyachi |
| 8,957,899 | B2 | 2/2015 | Takei |
| 9,316,831 | B2 | 4/2016 | Takahashi |
| 10,019,057 | B2 | 7/2018 | Osman |
| 2007/0146527 | A1 | 6/2007 | Takizawa |
| 2009/0295841 | A1 | 12/2009 | Park |
| 2010/0079356 | A1 | 4/2010 | Hoellwarth |
| 2011/0032268 | A1 | 2/2011 | Takei |
| 2011/0317072 | A1 | 12/2011 | Miyachi |
| 2012/0123742 | A1* | 5/2012 | Harrison ............ G02B 27/0012 703/1 |
| 2013/0293688 | A1 | 11/2013 | Benson |
| 2014/0266989 | A1 | 9/2014 | Takahashi |
| 2014/0361976 | A1 | 12/2014 | Osman |

FOREIGN PATENT DOCUMENTS

| | | |
|---|---|---|
| JP | 05300451 A | 11/1993 |
| JP | 07121093 A | 5/1995 |
| JP | 07212798 A | 8/1995 |
| JP | 07234656 A | 9/1995 |
| JP | 2003018498 A | 1/2003 |
| JP | 2004140736 A | 5/2004 |
| JP | 2005172851 A | 6/2005 |
| JP | 2006285064 A | 10/2006 |
| JP | 2007174567 A | 7/2007 |
| JP | 2009086133 A | 4/2009 |
| JP | 2011033943 A | 2/2011 |
| JP | 2012008497 A | 1/2012 |
| JP | 2016526237 A | 9/2016 |
| WO | 2012133379 A1 | 10/2012 |
| WO | 2013054728 A1 | 4/2013 |
| WO | 2014197231 A2 | 12/2014 |

OTHER PUBLICATIONS

International Search Report for corresponding PCT application No. PCT/JP2015/074015, 5 pages, dated Nov. 17, 2015.
European Search Report for corresponding EP application No. 15857201.6, 11 pages, dated Mar. 12, 2018.
Office Action for corresponding JP Patent Application No. 2014-224155, 8 pages, dated Oct. 9, 2018.

* cited by examiner

F I G . 1
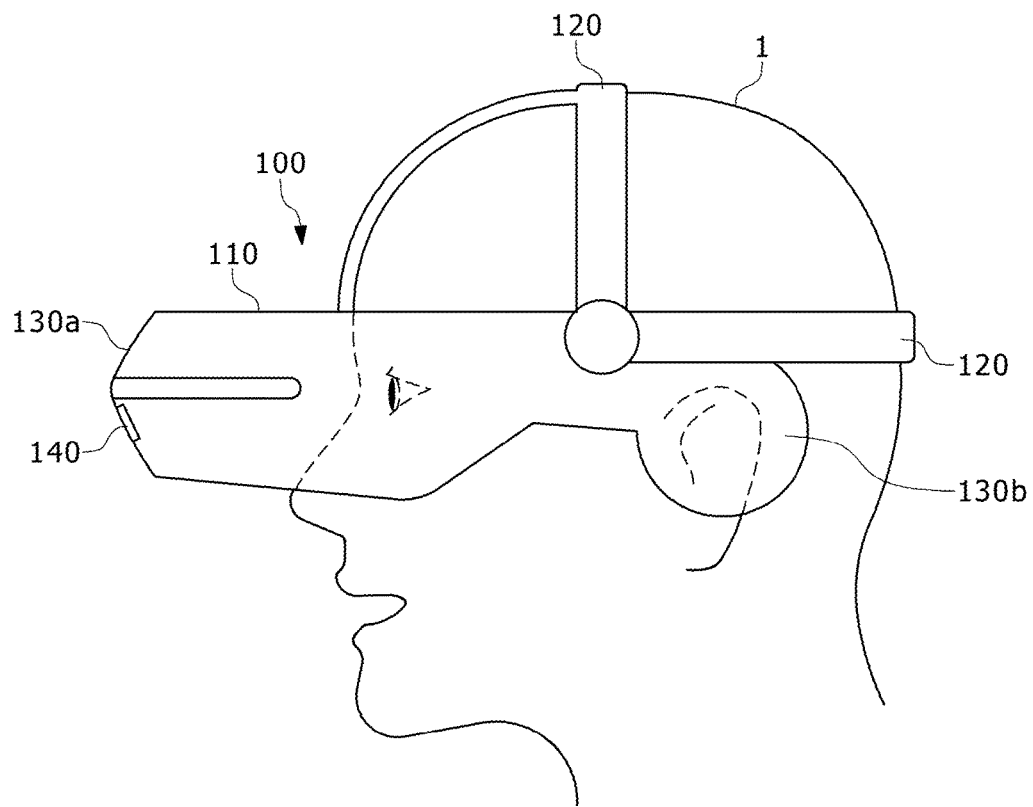
F I G . 2
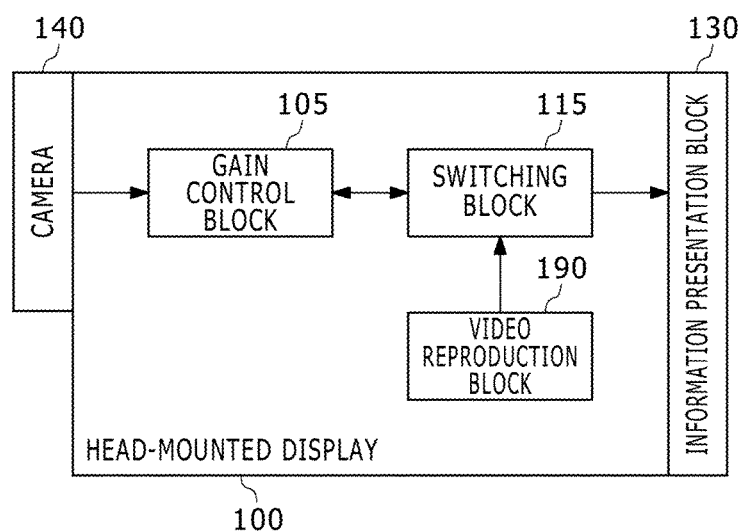

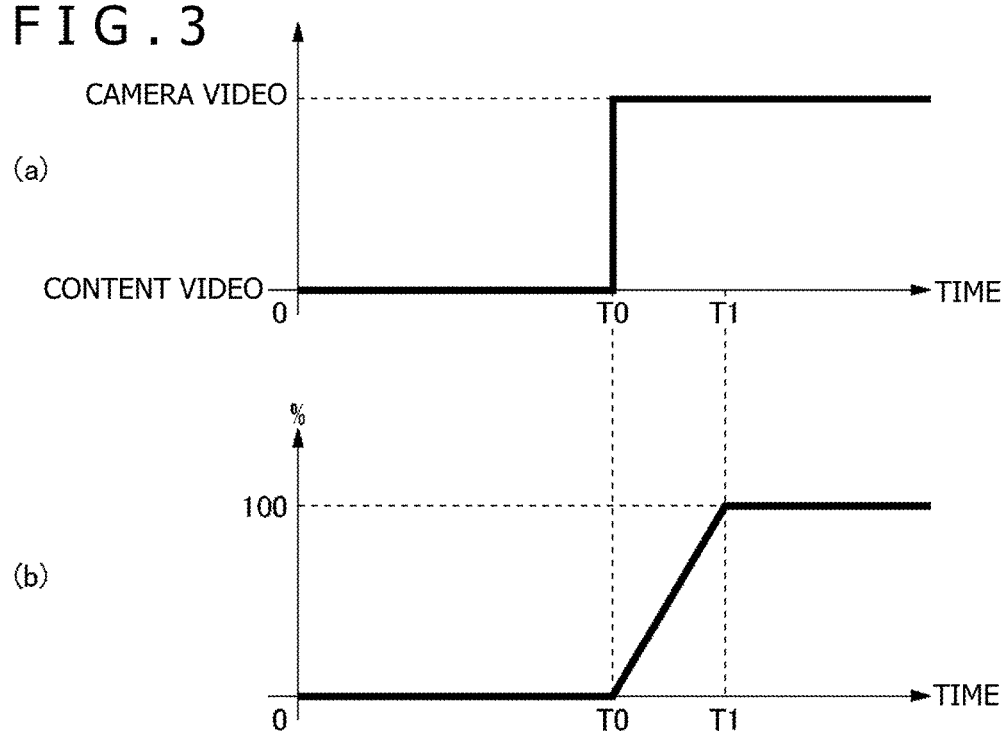
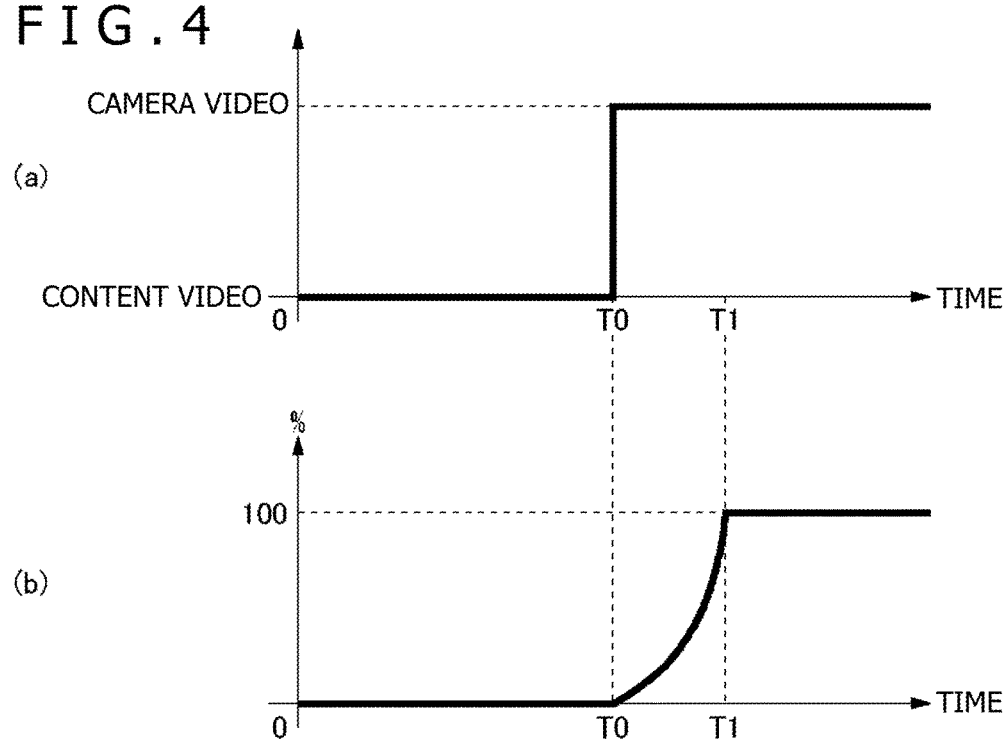

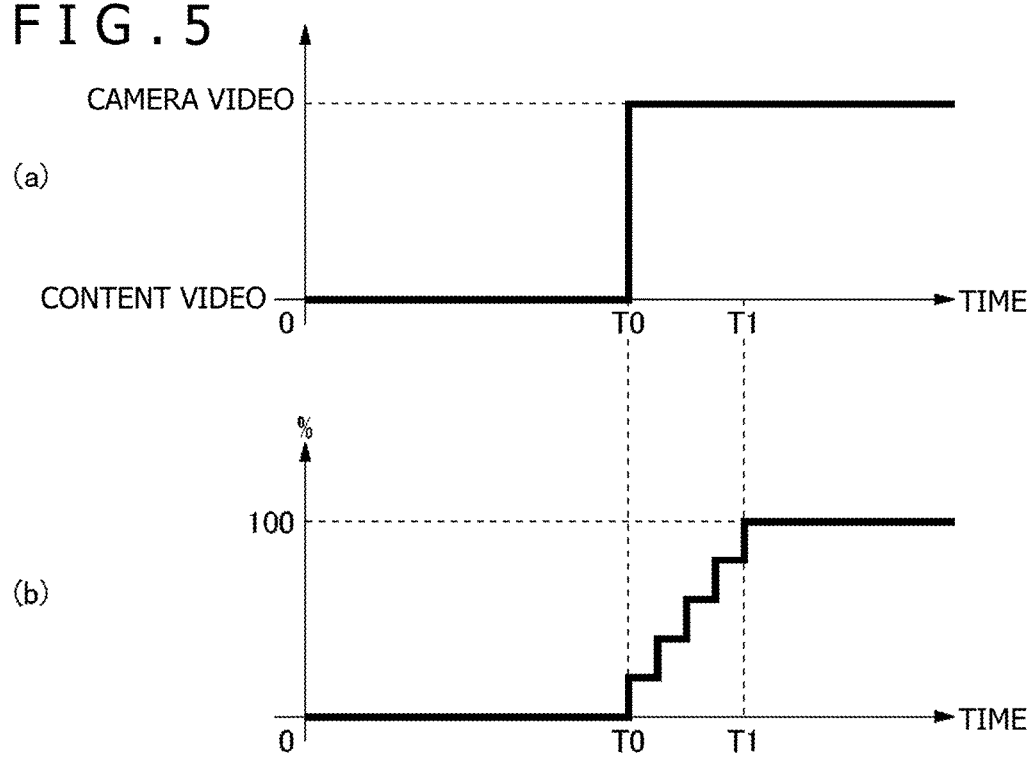

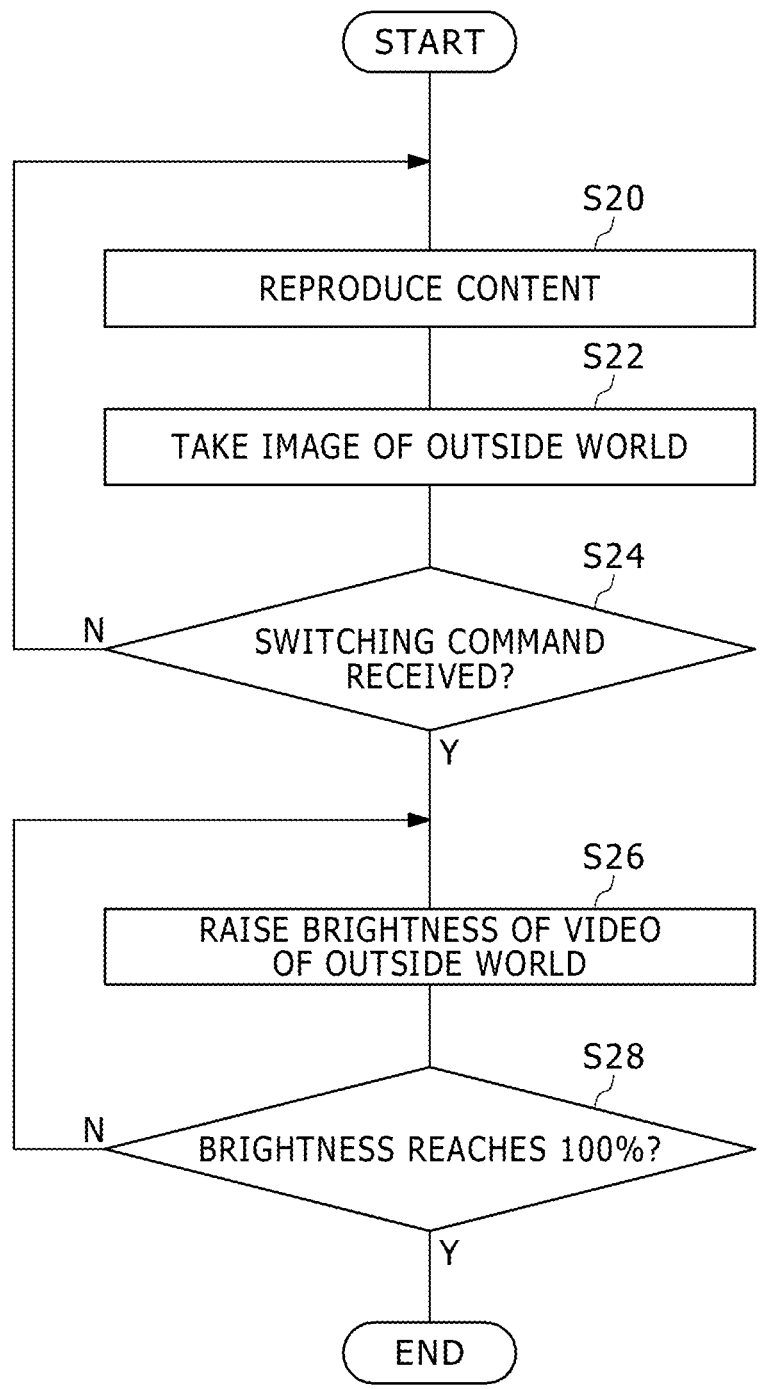

HEAD-MOUNTED DISPLAY AND BRIGHTNESS CONTROL METHOD

TECHNICAL FIELD

The present invention relates to a head-mounted display and a brightness control method executed by the head-mounted display.

BACKGROUND ART

Recently, a head-mounted display capable of presenting stereoscopic videos of depth has been popularized on the basis of the development of technologies for presenting stereoscopic videos. The head-mounted displays are capable of presenting videos of depth to users and used as three-dimensional (3D) content presentation devices, such as 3D movies and 3D games, for example.

A head-mounted display is worn on a user who is a watcher such that both eyes of the user are covered. Some head-mounted displays are of shielding type that videos are presented by shielding the outside world from the field of view of the user upon wearing on the user. In a situation with a head-mounted display of such shielding type worn, it is often difficult for the user to look at a real video in the outside world. Therefore, some of the head-mounted displays of shielding type each have a camera for taking an image of the outside world.

SUMMARY

Technical Problem

If a difference between the brightness of a video presented by a head-mounted display of shielding type and the brightness of a video of the outside world taken by a camera configured to take images of the outside world is large, switching from one video to be presented to a user to another video may give the user a sense of unnaturalness.

Therefore, the present invention has been made in view of the above-identified problem and it is an object of the present invention to provide a technology of mitigating a feeling of unnaturalness that is given to a user when a head-mounted display of shielding type switches between videos to be presented to the user.

Solution to Problem

In order to solve the problem mentioned above, there is provided in one mode of the present invention a head-mounted display for presenting a video by shielding an outside world from a field of view of a user when mounted on the user. The head-mounted display includes: an information presentation block configured to present information including audio and a moving image to the field of view of the user; a video reproduction block configured to reproduce a video of content; a camera configured to take a video of the outside world; a switching block configured to selectively switch between the video of the content and the video of the outside world and cause the selected video to be presented onto the information presentation block; and a gain control block configured to control a brightness of at least one of the video of the content and the video of the outside world.

In another mode of the present invention, there is provided a brightness control method executed by a processor of a head-mounted display for presenting a video by shielding an outside world from a field of view of a user when mounted on the user. The method includes: a step of reproducing a video of content; a step of taking a video of the outside world; and a step of selectively switching between the video of the content and the video of the outside world based on a command by the user and presenting the selected video to the user. The step of presenting includes a step of, when executing switching from one of the video of the content and the video of the outside world to the other, gradually increasing a brightness of the video of the other.

In still another mode of the present invention, there is provided a program for causing a computer to realize each of steps of the above-mentioned method.

This program may be provided as part of firmware that is assembled in a device for basically controlling hardware resources such as video and audio equipment, a game machine, and a head-mounted display. This firmware is, for example, stored in a semiconductor memory such as a read only memory (ROM) or a flash memory that is installed in the device. In order to provide this firmware or update part of the firmware, a computer-readable recording medium recording the above-mentioned program may be provided or this program may be transmitted via a communication line.

It should be noted that any one of combinations of the configurational elements mentioned above and those obtained by converting expressions of the present invention between method, apparatus, system, computer program, data structure, recording medium and so on are also valid for one of the modes of the present invention.

Advantageous Effect of Invention

According to the present invention, there is provided a technique of mitigating a sense of unnaturalness that is felt by a user when switching between videos presented by a head-mounted display of shielding type to the user.

BRIEF DESCRIPTION OF DRAWINGS

FIG. 1 is a diagram schematically illustrating an overview of an appearance configuration of a head-mounted display related with one embodiment.

FIG. 2 is a diagram schematically illustrating a functional configuration of the head-mounted display related with the embodiment.

FIGS. 3(a) and 3(b) are diagrams for describing one example of brightness control processing that is executed by a gain control block related with the embodiment.

FIGS. 4(a) and 4(b) are diagrams for describing another example of brightness control processing that is executed by the gain control block related with the embodiment.

FIGS. 5(a) and 5(b) are diagrams for describing still another example of brightness control processing that is executed by the gain control block related with the embodiment.

FIG. 6 is a flowchart describing a flow of brightness control processing that is executed by the head-mounted display related with the embodiment.

DESCRIPTION OF EMBODIMENT

Now, referring to FIG. 1, there is shown a diagram schematically illustrating an overview of an appearance configuration of a head-mounted display 100 related with one embodiment, a user 1 wearing the head-mounted display 100. The head-mounted display 100 related with the embodiment presupposes a head-mounted display of shielding type. Therefore, as shown in FIG. 1, when the head-mounted display 100 is put on the user 1, the head-mounted display 100 shields the outside world from the field of view of the user 1. Consequently, the user 1 is able to concentrate on a video of content presented by the head-mounted display 100, thereby being put in an increased so-called "sense of immersion."

The head-mounted display 100 has a case 110 and a mounting fixture 120. The mounting fixture 120 is a member for fixing the case 110 on the head of the user 1 and can be realized by a fastening or elastic belt, for example. The case 110 houses a moving-image presentation block 130a such as a central processing unit (CPU) not shown, a liquid crystal display (LCD) or an organic electro-luminescence (EL) and an audio presentation block 130b such as a speaker and an earphone. It should be noted that, in the present specification, "video" includes "moving image" that is an image continuous in terms of time and "audio" that is reproduced in synchronization with or independently of this moving image. The head-mounted display 100 further has a camera 140 configured to measure the information external to the case 110.

Referring to FIG. 2, there is shown a diagram schematically illustrating a functional configuration of the head-mounted display 100 related with the embodiment. The head-mounted display 100 has a gain control block 105, a switching block 115, and a video reproduction block 190.

FIG. 2 shows a functional configuration for the head-mounted display 100 related with the embodiment to realize the brightness control processing on video with other configurations omitted. In FIG. 2, each of the elements described as functional blocks for executing various processing operations can be configured by a CPU, a main memory, or another large scale integration (LSI) in hardware approach. In software approach, some of the functional blocks are realized by programs and so on loaded in the main memory. Therefore, that these functional blocks may be realized in various forms, hardware only, software only, or combinations thereof, is understandable by those skilled in the art and the forms of the realization are not limited to any particular ones.

The video reproduction block 190 reproduces the video of content that is presented to the user 1. The video reproduction block 190 reproduces content obtained through a memory card slot or universal serial bus (USB), not shown, or a wireless method such as wireless fidelity (Wi-Fi) (registered trademark). An information presentation block 130 includes the moving-image presentation block 130a and the audio presentation block 130b mentioned above so as to present information including audio and video to the field of view of the user 1. For example, the information presentation block 130 presents the video reproduced by the video reproduction block 190 to the user 1. The information presentation block 130 presents information such as a moving image and a still image on the moving-image presentation block 130a and audio information on the audio presentation block 130b. The information presentation block 130 functions as a user interface that presents the information generated by the head-mounted display 100 to the user 1.

The camera 140 takes the video of the world external to the case 110. The camera 140 is mounted at a position that is external to the case 110 of the head-mounted display 100 and corresponds to a position at which the moving-image presentation block 130a is accommodated. Therefore, when the user 1 wears the head-mounted display 100, the camera 140 is ready to take the video of the outside world in the direction of the line of sight of the user 1.

The camera 140 can be realized by use of a solid-state imaging device such as a charge coupled device (CCD) or a complementary metal oxide semiconductor (CMOS) for measuring visible light, for example. It should be noted that the camera 140 may be a stereo camera having at least two cameras. Consequently, the information about the depth of an object can be obtained by analyzing the information measured by the camera 140 by use of the CPU of the head-mounted display 100.

The switching block 115 selectively switches between the video of the content reproduced by the video reproduction block 190 and the video of the outside world imaged by the camera 140. The switching block 115 is connected to the information presentation block 130 which presents the video obtained by the selection by the switching block 115 to the user 1.

Although not shown, a manipulation block through which the selecting of the switching block 115 is directed is arranged on the case 110 of the head-mounted display 100. For the manipulation block to be easily operated with the head-mounted display 100 worn on the user 1, the manipulation block may be configured by one pushbutton (not shown) for example. In this case, when the user 1 presses the pushbutton, the switching block 115 switches the currently selected video to another video.

In general, it is considered that there is a difference between brightness values of the video of the content reproduced by the video reproduction block 190 and the video of the outside world imaged by the camera 140. The head-mounted display 100 related with the embodiment is a head-mounted display of shielding type and the information presentation block 130 is arranged at a position near the eyes of the user 1. Therefore, if the information presentation block 130 displays the video of the content reproduced by the video reproduction block 190 under normal usage conditions of the head-mounted display 100, the video of low brightness is often sufficient as compared with the brightness of indoor illumination for example.

If the user 1 switches the information presentation block 130 to the presentation of the video of the outside world while the information presentation block 130 is reproducing the video of content, the video to be presented by the information presentation block 130 is switched from the video of low brightness to the video of high brightness. If the eyes of the user 1 are accustomed to the video of the content of low brightness, it may sometimes be difficult for the user 1 to watch the video of the outside world immediately after the video switching.

Therefore, if the switching block 115 switches from video of content to the video of the outside world, the gain control block 105 gradually increases the brightness of the video of the outside world. For this purpose, the gain control block 105 is connected between the camera 140 and the switching block 115.

Referring to FIGS. 3(a) and 3(b), there are shown diagrams for describing one example of the brightness control processing executed by the gain control block 105 related with the embodiment. FIG. 3(a) is a diagram showing the timing of video switching executed by the switching block 115. In the graph shown in FIG. 3(a), the horizontal axis is the time axis indicative of the lapse of time.

From time 0 to time T0, the switching block 115 is selecting the video of content. At time T0, the switching block 115 gets a command for switching from the video of content to the video of the camera 140. For this reason, at time T0, the switching block 115 selects the video of the camera 140. Subsequent to time T0, the switching block 115 continues the selection of the video of the camera 140.

FIG. 3(b) is a diagram showing the brightness control of the video of the camera 140 by the gain control block 105. The horizontal axis of the graph shown in FIG. 3(b) is the time axis indicative of the lapse of time and matches the horizontal axis of the graph shown in FIG. 3(a). The vertical axis of the graph shown in FIG. 3(b) is the axis indicative of the control ratio of the video of the camera 140. In the graph shown in FIG. 3(b), the control ratio of the video of the camera 140 is indicated in percentage. One hundred percent denotes that the gain control block 105 outputs the video of the camera 140 without controlling the brightness while zero percent denotes that the brightness of the video of the camera 140 is set to zero percent, namely, the video having no brightness is outputted. Therefore, as the control ratio of video is increased, the brightness value of that video is increased.

As shown in FIG. 3(b), while the switching block 115 selects the video of content, the switching block 115 sets the control ratio of the video of the camera 140 to 0%. Hence, in FIG. 3(b), from time 0 to time T0, the control ratio of the video of the camera 140 is set to 0%.

At time T0, receiving a command for switching from the video of content to the video of the camera 140, the switching block 115 outputs this information to the gain control block 105. Receiving the switching command from the switching block 115, the gain control block 105 starts the brightness control on the video of the camera 140. To be more specific, the gain control block 105 increases the control ratio at a constant increase rate such that the control ratio reaches 100% after passing of a predetermined time from the start of brightness control at time T0.

Here, "predetermined time" denotes "brightness control reference time" to be referenced by the gain control block 105 in order to complete the brightness control of the video of the camera 140. The brightness control reference time may be experimentally determined by considering the properties of the light reflex of human pupil, the type of the content supposed for reproduction by the head-mounted display 100, and the necessity of switching to the video of the camera 140, for example. For an example that is not limited, the brightness control reference time is ten seconds. In the example shown in FIG. 3(b), the time from time T0 to time T1 is the brightness control reference time. In this sense, an interval from time T0 to time T1 may be said to be "brightness control interval."

In the example shown in FIG. 3(b), the control ratio of the video of the camera 140 reaches 100% at time T1 when the brightness control reference time passed from time T0. Thus, continuously and gradually increasing a brightness value of the video of the camera 140 by the gain control block 105 allows the user 1 to obtain a time during which the user 1 gets adapted to the brightness of the video of the camera 140. As a result, the feeling of unnaturalness (glare or the like for example) that the user 1 feels at the time of switching from the video of content to the video of the camera 140 can be reduced.

FIGS. 4(a) and 4(b) are diagrams illustrating another example of the brightness control processing that is executed by the gain control block 105 related with the embodiment. The graph shown in FIG. 4(a) is the same as the graph shown in FIG. 3(a). The vertical axis and the horizontal axis of the graph shown in FIG. 4(b) are the same as the vertical axis and the horizontal axis of the graph shown in FIG. 3(b), respectively.

As with the example shown in FIG. 3(b), the gain control block 105 starts the brightness control on the video of the camera 140 upon acquisition of a switching command from the switching block 115 in the example shown in FIG. 4(b). Also, in the example shown in FIG. 4(b), the gain control block 105 increases the control ratio such that the control ratio reaches 100% after the passing of the brightness control reference time from the start of the brightness control at time T0.

However, in the example shown in FIG. 4(b), the gain control block 105 does not increase the control ratio with a constant increase rate unlike the example shown in FIG. 3(b). Instead, the gain control block 105 changes the increase rate of the control ratio as time passes after the video switching by the switching block 115. As a result, the increase rate of the brightness of the video of the camera 140 also changes as time passes.

To be more specific, the gain control block 105 changes the control ratio such that the increase rate of the control ratio increases as time passes. Hence, as shown in FIG. 4(b), the control ratio of the video of the camera 140 exponentially increases in the brightness control interval from time T0 to time T1. As a result, the video of the camera 140 increases in brightness with the increase rate of brightness increasing as time passes.

In the example shown in FIG. 4(b), the tilt of the control ratio of the first half of the brightness control interval is small and the tilt in the last half gets greater as compared with the example shown in FIG. 3(b). Consequently, the video of the camera 140 slowly increases in brightness immediately after switching; as the eyes of the user 1 gets adapted to the brightness of light, the speed of increase in brightness can be pushed up.

FIGS. 5(a) and 5(b) are diagrams for describing still another example of the brightness control processing that is executed by the gain control block 105 related with the embodiment. The graph shown in FIG. 5(a) is the same as the graph shown in FIG. 3(a). The vertical axis and the horizontal axis of the graph shown in FIG. 5(b) are the same as the vertical axis and the horizontal axis of the graph shown in FIG. 3(b), respectively.

In the example shown in FIG. 5(b), the gain control block 105 starts the brightness control on the video of the camera 140 upon acquisition of a switching command from the switching block 115 as with the example shown in FIG. 3(b). In the example shown in FIG. 5(b), the gain control block 105 also increases the control ratio such that the control ratio reaches 100% after passing of the brightness control reference time from the start of the brightness control at time T0.

However, in the example shown in FIG. 5(b), the gain control block 105 does not increase the control ratio with a constant increase rate unlike the example shown in FIG. 3(b). Instead, the gain control block 105 increases step-wise the control ratio after the video switching by the switching block 115. As a result, the brightness of the video of the camera 140 increases step-wise as time passes. Hence, in the example shown in FIG. 5(b), the user 1 is able to observe the video of the camera 140 at time T0 unlike the example shown in FIG. 3(b) or 4(b). The example of brightness control shown in FIG. 5(b) is advantageous in that the information external to the head-mounted display 100 can be observed immediately after video switching.

Referring to FIG. 6, there is shown a flowchart for describing a flow of the brightness control processing that is executed by the head-mounted display 100 related with the embodiment. The processing described in this flowchart starts when the power to the head-mounted display 100 is turned on, for example.

The video reproduction block 190 reproduces content such as 3D movies and 3D games (S20). The camera 140 takes an image of the outside world of the head-mounted display 100 (S22).

If no video switching command comes to the switching block 115 from the user 1 (N of S24), then the flow returns to step S20 to continue the processing described above. If the switching block 115 receives a video switching command from the user 1 (Y of S24), then the gain control block 105 raises the control ratio so as to raise the brightness of the video of the camera 140 (S26).

If the control ratio of the brightness of the video of the camera 140 is less than 100% (N of S28), then the gain control block 105 continues the processing of raising the brightness of the video of the camera 140. When the control ratio of the brightness of the video of the camera 140 reaches 100% (Y of S28), then the processing described in this flowchart ends.

As described above, according to the head-mounted display 100 of shielding type related with the embodiment, the sense of unnaturalness that may be given to the user 1 is mitigated when switching between videos to be presented to the user 1 is done.

Especially, when the video of the content reproduced by the video reproduction block 190 is switched to the video of the outside world imaged by the camera 140 so as to be presented on the information presentation block 130, the situation in which the user 1 feels the glare due to the increased brightness of the video is mitigated.

The present invention has been described based on the embodiment. It is to be understood by those skilled in the art that the embodiment is illustrative, that combinations of components and processes thereof can be modified in various ways, and that these modification examples also fall within the scope of the present invention.

In the above description, a case is mainly described in which the gain control block 105 controls brightness values of the video of the camera 140 when switching is done from the video of content to the video of the camera 140. Alternatively or additionally, the gain control block 105 may control brightness values of the video of content when switching from the video of the camera 140 to the video of content. That is, the switching block 115 may control the brightness of at least one of the video of the camera 140 and the video of the video reproduction block 190.

In this case, the gain control block 105 is connected to both the camera 140 and the video reproduction block 190. Therefore, the switching block 115 may also have the function of the gain control block 105. When the switching block 115 switches one of the video of the content and the video of the outside world to the other, the gain control block 105 gradually increases the brightness of the video of that other.

Consequently, if the video of the camera 140 is darker than the video of the content, then the situation in which the user 1 feels glare when switching from the video of the camera 140 to the video of the content is mitigated.

In the above description, a case is described in which the switching block 115 selectively switches between the video of the camera 140 and the video of the content reproduced by the video reproduction block 190. In addition, the switching block 115 may gradually execute switching between the video of the camera 140 and the video of the content by blending these videos or display one video in a small area arranged in the other video. Also, the switching block 115 may gradually expand the small area, eventually executing switching to the other video.

REFERENCE SIGNS LIST

100 . . . Head-mounted display, 105 . . . Gain control block, 110 . . . Case, 115 . . . Switching block, 120 . . . Mounting fixture, 130 . . . Information presentation block, 130a . . . Moving-image presentation block, 130b . . . Audio presentation block, 140 . . . Camera, 190 . . . Video reproduction block

INDUSTRIAL APPLICABILITY

The present invention is usable for a brightness control technology in a head-mounted display.

The invention claimed is:

1. A head-mounted display for presenting a video by shielding an outside world from a field of view of a user when mounted on the user, comprising:
   an information presentation block configured to present information including audio and a moving image to the field of view of the user;
   a video reproduction block configured to reproduce a video of content;
   a camera configured to take a video of the outside world;
   a switching block configured to selectively switch between the video of the content and the video of the outside world and cause the selected video to be presented onto the information presentation block; and
   a gain control block configured to control a brightness of at least one of the video of the content and the video of the outside world, such that the brightness varies when selectively switching between the video of the content and the video of the outside world.

2. The head-mounted display according to claim 1, wherein, when the switching block switches from one of the video of the content and the video of the outside world to the other, the gain control block gradually increases the brightness of the video of the other.

3. The head-mounted display according to claim 2, wherein the gain control block, connected between the camera and the switching block, gradually increases the brightness of the video of the outside world when the switching block switches from the video of the content to the video of the outside world.

4. The head-mounted display according to claim 1, wherein the gain control block increases a brightness of a video by changing an increase rate of the brightness of the video as time passes.

5. The head-mounted display according to claim 4, wherein the gain control block increases a brightness of a video by increasingly changing an increase rate of the brightness of the video as time passes.

6. A brightness control method executed by a processor of a head-mounted display for presenting a video by shielding an outside world from a field of view of a user when mounted on the user, the method comprising:
   reproducing a video of content;
   taking a video of the outside world; and
   selectively switching between the video of the content and the video of the outside world based on a command by the user and presenting the selected video to the user;
   wherein the presenting includes, when executing switching from one of the video of the content and the video of the outside world to the other, gradually increasing a brightness of the video of the other.

\* \* \* \* \*